H. P. CHRISTIANSON.
CIRCUIT CLOSER.
APPLICATION FILED JAN. 3, 1912.
1,043,755.
Patented Nov. 5, 1912.
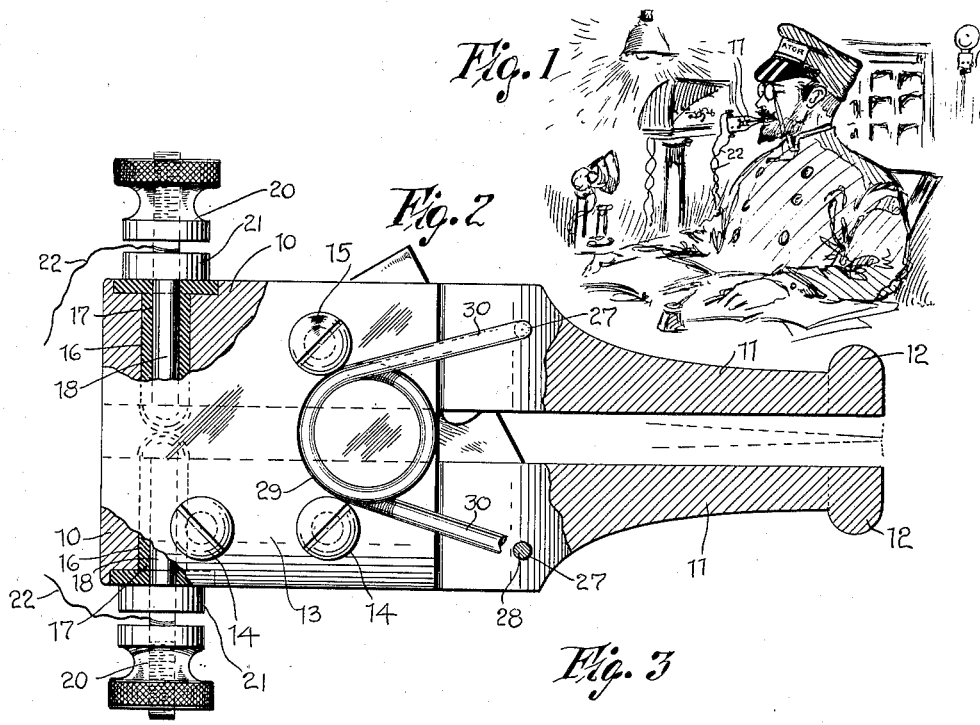
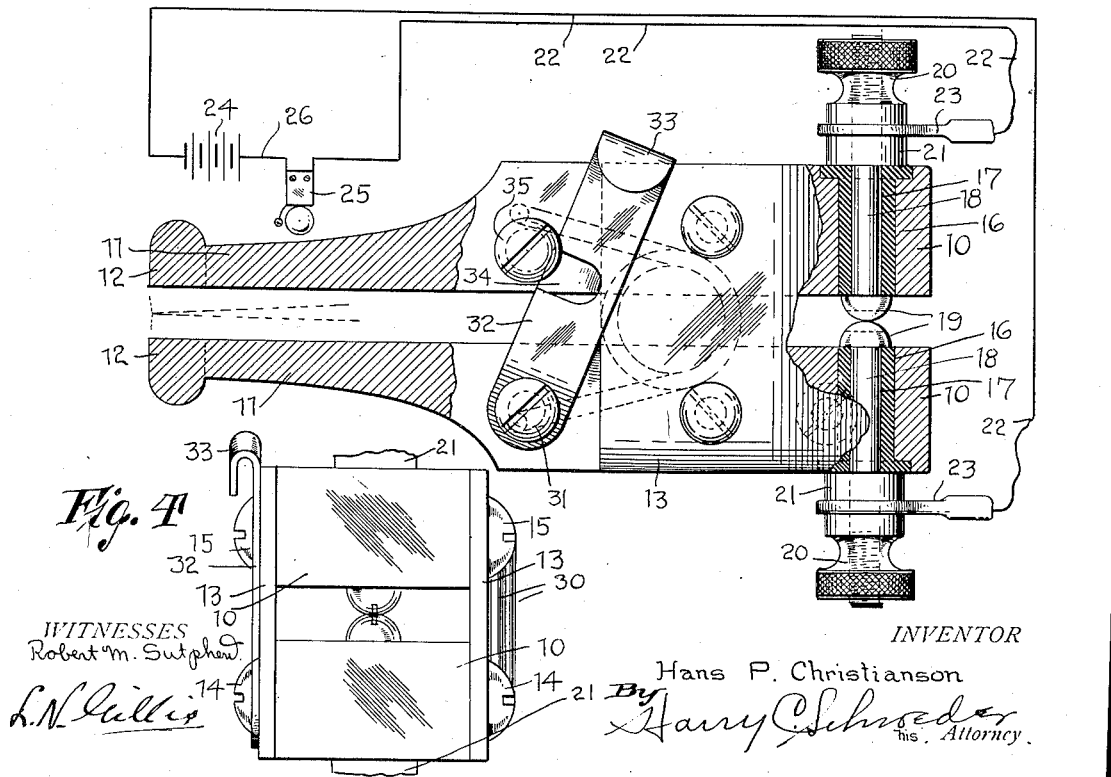
WITNESSES
Robert M. Sutphen
L. N. Gillis
INVENTOR
Hans P. Christianson
By Harry C. Schroeder
his Attorney

UNITED STATES PATENT OFFICE.

HANS P. CHRISTIANSON, OF OAKLAND, CALIFORNIA, ASSIGNOR OF ONE-HALF TO A. J. HANFORD, OF OAKLAND, CALIFORNIA.

CIRCUIT-CLOSER.

1,043,755.  Specification of Letters Patent.  Patented Nov. 5, 1912.

Application filed January 3, 1912. Serial No. 669,247.

*To all whom it may concern:*

Be it known that I, HANS P. CHRISTIANSON, a citizen of the United States, residing at Oakland, in the county of Alameda and State of California, have invented certain new and useful Improvements in Circuit-Closers, of which the following is a specification.

This invention relates to electrical apparatus adapted to actuate a sonant or visible signal by the closing of an electric circuit, the circuit being controlled by the unconscious movement of certain muscles of an individual.

The principal object of the invention is to provide a novel form of circuit closing device especially adapted to be held between a person's teeth so that in the event of the jaw muscles relaxing in sleep or other unconsciousness a signal will be sounded.

The device is intended especially for use by train telegraph operators, so that in case they fall asleep they may be aroused by the ringing of a bell or the like.

With the above and other objects in view, the invention consists in general of certain novel details of construction, and arrangements and combinations of parts, as will be hereinafter fully illustrated, described, and specifically claimed.

In the accompanying drawings, like characters of reference, indicate like parts in the several views, and: Figure 1 is a view showing the manner in which the device is intended to be used, an operator being illustrated as holding the device between his teeth. Fig. 2 is a view from one side of the invention, the view being partly in section. Fig. 3 is a view from the opposite side of the invention, the view being partly in section and being diagrammatically connected with a signal and source of electricity. Fig. 4 is a front end view of the device.

The invention consists in general of a pair of bars having substantially rectangular body portions 10 and the bars are tapered down like the bit of a pipe at one end as indicated at 11, the tapering portions being provided with an enlargement 12 such as is common at the end of a pipe bit. It is furthermore preferred to make these portions of a size corresponding to that of a pipe bit when the two portions 11 are moved together to the dotted line positions shown in Figs. 2 and 3.

Secured to one of the portions 10 on opposite sides thereof are plates 13, the plates being held fixed to said portion by means of suitable screws 14. The other portion 10 is received between the projecting parts of these plates and is pivoted thereto by means of screws 15. These members 10 may, if desired, be made of ebony or other non-conductor, and are provided with openings 16 wherein are held insulating sleeves 17. Through the sleeves 17 pass the stems 18 of set screws which are provided at their adjacent ends with rounded heads 19 and have screwed upon the projecting ends the thumb nuts 20, there being collars 21 interposed to form washers so that wires 22 may be held between the nuts and the washers. These wires are preferably provided at their ends with some form of connector as indicated at 23 in Fig. 3 and one of the wires 22 extends to a battery 24 or any other suitable source of electrical current while the other wire extends to a signal 25 here shown as a bell, the signal and battery being also connected by a wire 26.

For the purpose of normally holding the ends 19 in contact and completing the electric circuit, the members 10 are provided each with a circular recess 27 arranged to receive the downwardly bent end 28 of a coiled spring 29 which is provided with arms 30, from which said downwardly bent ends extend. This coil spring is preferably arranged so that it lies flat against one of the plates 13, the spring employed being slightly more than one complete coil so that the arms 30 diverge under normal conditions as can clearly be seen by reference to Fig. 2. Furthermore the recesses 27 simplify the application or replacement of the spring.

Upon one of the members 10 there is provided a pivot screw 31 whereto is pivoted an arm 32 having an outwardly curved finger grip 33. Between the pivot point and the free end of the arm 32 there is provided a notch 34 which is so positioned that it may engage the shank of a screw 35 carried upon the remaining member 10 when the two ends 12 are brought together.

In the operation of the device the telegraph operator or other person using the invention grips the portions 11 between his teeth in the same manner as that in which a pipe is held, thus bringing the ends 12 together, these ends preventing any tendency to slip out of the mouth. This separates the contacts 19 and opens the circuit through the battery and bell so that the bell will not operate. If the operator becomes drowsy his muscles naturally relax and under the strain of the spring 29 his jaws will open, thus allowing the contacts 19 to close and in consequence establishing a circuit through the battery and bell and ringing the latter so that the operator will wake up.

When the device is not in use it is simply necessary to close the members 12 together with the fingers and swing the arm 32 until the notch 34 engages the pin 35. The fingers may then be released from the members 12 and these members will stay together on account of the engagement of the member 32 with the pin 35.

There has thus been provided a simple and efficient device of the kind described and for the purpose specified.

It is obvious that many minor changes may be made in the form and construction thereof without departing from the material principles of the invention, and it is therefore not desired to confine the device to the exact form herein shown and described, but it is wished to include all such as properly come within the scope claimed.

Having thus described the invention, what is claimed as new, is:

In a device of the kind described, a pair of members, plates fixedly secured to each side of one of said members, a pivot connection between the plates and the remaining member between the ends thereof whereby the remaining member may be oscillated with reference to the first member, binding posts oppositely disposed on said members and provided with enlarged ends forming contacts, reduced ends formed on said members and adapted to be grasped between the teeth of a person, enlarged extremities on said ends to prevent slipping between the teeth, a spring normally holding the reduced ends apart, a notched arm having one end pivotally connected to one of said members, and a pin on the other member adapted for engagement by the notch when the contacts are held apart.

In testimony whereof I affix my signature in presence of two witnesses.

HANS P. CHRISTIANSON.

Witnesses:
A. J. HANFORD,
F. P. SCHROEDER.